No. 791,486. Patented June 6, 1905.

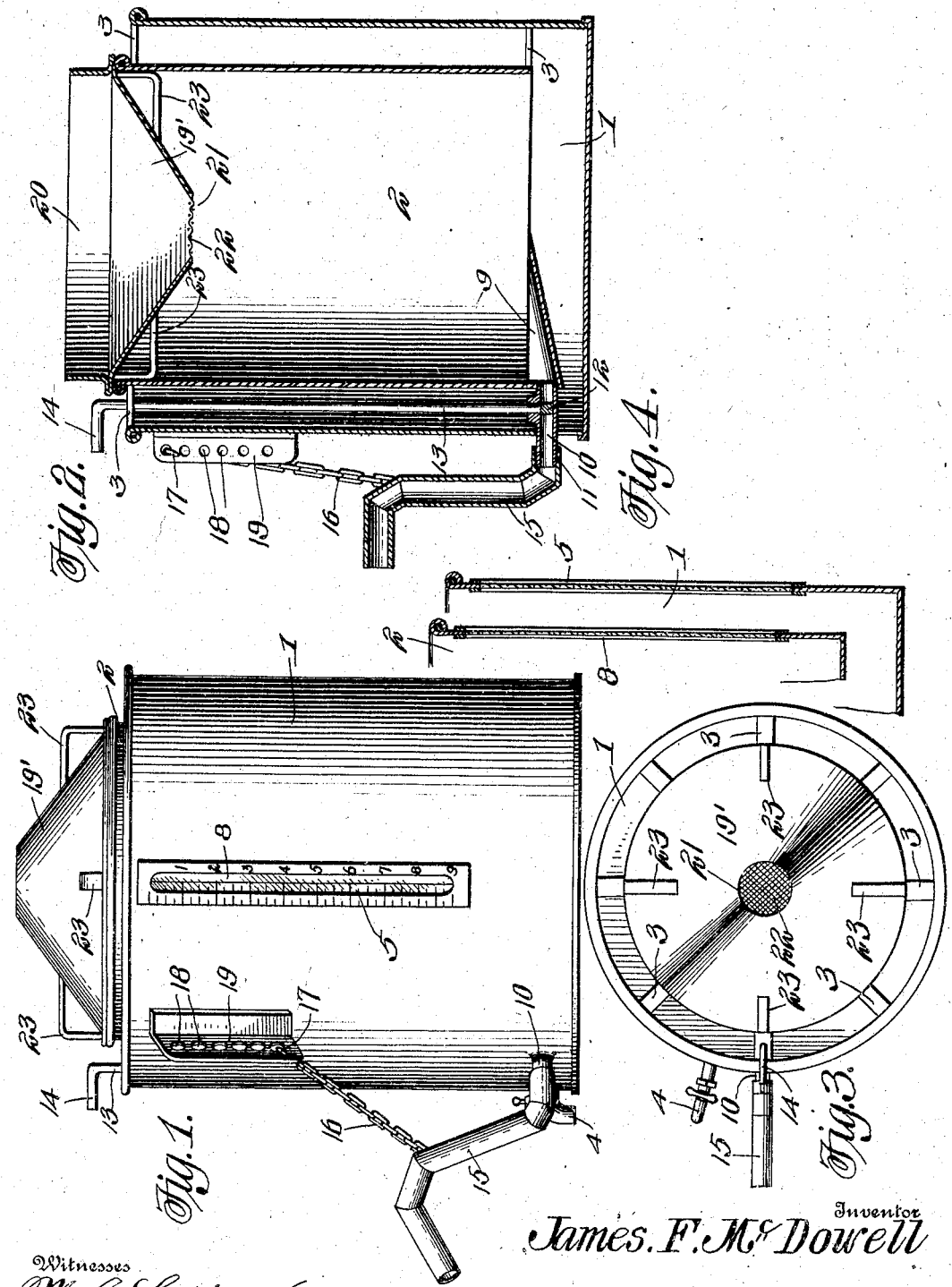

UNITED STATES PATENT OFFICE.

JAMES F. McDOWELL, OF CHARITON, IOWA.

CREAM-SEPARATOR.

SPECIFICATION forming part of Letters Patent No. 791,486, dated June 6, 1905.

Application filed June 27, 1904. Serial No. 214,413.

*To all whom it may concern:*

Be it known that I, JAMES F. MCDOWELL, a citizen of the United States, residing at Chariton, in the county of Lucas and State of Iowa, have invented certain new and useful Improvements in Cream-Separators; and I do declare the following to be a full, clear, and exact description of the invention, such as will enable others skilled in the art to which it appertains to make and use the same.

My invention relates to improvements in cream-separators; and it consists in certain novel features of construction, combination, and arrangement of devices, as will be hereinafter described and claimed.

The object of the invention is to improve and simplify the construction and operation of devices of this character, and thereby render them more durable and efficient in use and less expensive of manufacture.

In the accompanying drawings, Figure 1 is a front elevation of my improved cream-separator. Fig. 2 is a vertical sectional view of the same, the cover of the inner receptacle being shown in inverted position to act as a strainer. Fig. 3 is a top plan view of the separator, and Fig. 4 is a detail vertical sectional view through the alining sight-openings of the inner and outer receptacles of the separator.

Referring to the drawings by numeral, 1 denotes an outer receptacle, and 2 an inner receptacle which is spaced from the bottom and sides of the said outer receptacle by straps or fingers 3. These receptacles may be constructed in any suitable form and of any desired material; but they are preferably made cylindrical in form and of sheet metal, as shown. The outer receptacle, which is adapted to contain water or other cooling liquid, is provided adjacent to its bottom with a draw-off cock or faucet 4, and at a suitable point in its side is a sight-opening 5. The said opening 5 is covered with glass, and a suitable scale is provided along its edge. Alining with said sight-opening 5 in the outer receptacle is a similar sight-opening 8 in the inner receptacle. This opening 8 is also covered with glass and is provided with a scale similar to that upon the sight-opening 5. The inner receptacle 2, which is adapted to receive the milk and cream, is formed in its bottom with an inclined groove 9, the outer end of which is connected to a draw-off tube 10, which projects through the outer receptacle 1 and has its outer end screw-threaded, as at 11. In said tube 10 is a turning plug-valve 12, to the upper end of which is secured an operating-rod 13, which projects upwardly between the inner and outer receptacle and through the bearing-opening formed in one of said spacing-straps 3. At the extreme upper end of said rod is formed a handle 14, by means of which said valve may be turned to open or close the outlet-tube 10. Upon the screw-threaded end 11 of the outlet-tube 10 is secured a discharge-spout 15, which is adapted to swing in a vertical plane and to be adjusted at any desired elevation. Said discharge-spout is tubular and substantially L-shaped. The adjustment of the discharge-spout 15 is effected by securing to its outer end one end of a chain or other flexible connection 16, upon the opposite end of which is provided a hook 17, and engaging said hook in one of the openings of a vertical series of apertures 18, formed in a vertically-disposed plate 19, secured to the outer side of the receptacle 1 adjacent to its upper end. It will be seen that by engaging said hook 17 in one of the openings 18 the outer end of the discharge-spout may be secured at the desired elevation, so that any desired quantity of milk within the receptacle 2 may be drawn off when the valve 12 is opened. The open top of the inner receptacle is closed by a removable cover 19, which is conical in form and provided with a depending flange 20, which engages the top of the receptacle 2 when the cover is placed thereon. In the center or apex of the cone-shaped portion of the cover is formed an opening 21, which is covered by wire-gauze or other reticulated material 22, which permits the cover to serve as a strainer when it is inverted and placed upon the top of the receptacle 2. In order to permit the cover to set firmly upon the receptacle 2 when in its inverted position, right-angular-shaped brackets 23 are secured at suitable intervals upon its top. Two of said brackets, which are disposed at diametrically opposite points upon said cover, are of greater size than the others and are adapted to serve as handles to permit the cover to be readily applied and removed.

The operation of the separator will be readily understood from the foregoing description, taken in connection with the accompanying drawings. It will be understood that the milk is poured into the inner receptacle through the opening in its cover when the latter is in its inverted position, as shown in Fig. 2, and that water or other cooling liquid is placed in the space between the outer and inner receptacle. When it is desired to skim the cream, the hook upon the chain is engaged with the lowermost opening in the plate 19 and the spout is swung downward as far as said chain will permit it to drop. The valve 12 is then opened, and the milk beneath the cream in the receptacle 2 will be permitted to pass out through the tube 10 and spout 15. The milk will be thus withdrawn, leaving the cream in the receptacle 2. It will be understood that the height of the spout 15 corresponds to the quantity of cream in the receptacle 2.

Various changes in the form, proportion, and the minor details of construction may be resorted to without departing from the principle or sacrificing any of the advantages of this invention.

Having thus described my invention, what I claim, and desire to secure by Letters Patent, is—

The herein-described cream-separator consisting of the spaced inner and outer receptacles, an outlet-tube for said inner receptacle provided with a valve, the stem of which extends out through the top of the outer receptacle, and an outer screw-threaded end, an L-shaped tubular discharge-spout screwed upon and adjustable upon said threaded end and in a vertical plane, a plate upon said outer receptacle formed with a vertical series of apertures, and a flexible connection having one end secured to said spout and its other end provided with a hook to engage any of the apertures in said plate, to adjust the discharge end of said spout at the required height to remove the milk only from the separator.

In testimony whereof I have hereunto set my hand in presence of two subscribing witnesses.

JAMES F. McDOWELL.

Witnesses:
CHAS. MANK,
B. R. PLOTTS.